(12) United States Patent
Stretch

(10) Patent No.: US 11,959,402 B2
(45) Date of Patent: *Apr. 16, 2024

(54) VARIABLE INTAKE VALVE CLOSING USING THROUGH AXLE ROCKER ARM

(71) Applicant: Eaton Intelligent Power Limited, Dublin (IE)

(72) Inventor: Dale Arden Stretch, Novi, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,321

(22) Filed: Oct. 25, 2021

(65) Prior Publication Data

US 2022/0112821 A1 Apr. 14, 2022

Related U.S. Application Data

(63) Continuation of application No. 16/447,071, filed on Jun. 20, 2019, now Pat. No. 11,156,133, which is a
(Continued)

(51) Int. Cl.
*F01L 1/18* (2006.01)
*F01L 1/08* (2006.01)
(Continued)

(52) U.S. Cl.
CPC .................. *F01L 1/185* (2013.01); *F01L 1/08* (2013.01); *F01L 13/0021* (2013.01);
(Continued)

(58) Field of Classification Search
None
See application file for complete search history.

(56) References Cited

U.S. PATENT DOCUMENTS

| | | | |
|---|---|---|---|
| 2,647,500 | A | 8/1953 | Heinrich |
| 4,643,141 | A | 2/1987 | Bledsoe |

(Continued)

FOREIGN PATENT DOCUMENTS

| | | |
|---|---|---|
| CN | 100455773 C | 1/2009 |
| CN | 105317539 A | 2/2016 |

(Continued)

OTHER PUBLICATIONS

International Search Report and Written Opinion for International Application No. PCT/US2016/067974 dated Sep. 21, 2017, 17 pages.

*Primary Examiner* — Wesley G Harris
(74) *Attorney, Agent, or Firm* — Pearne & Gordon LLP

(57) ABSTRACT

A method of using a through axle switching rocker arm according to one example of the present disclosure is provided. The switching rocker arm comprises an outer and inner arm and a roller axle. The inner arm is pivotally coupled to the outer arm about a pivot axle and has an inner bushing that supports an inner roller. The inner bushing defines an inner diameter. The roller axle extends through the inner bushing and defines an outer diameter. The inner diameter of the inner bushing engages the outer diameter of the roller axle thereby inhibiting further pivoting of the inner arm relative to the outer arm defining a rocker arm travel constraint. The method includes designing first and second cam profiles based on the through axle switching rocker arm such that a difference in lift between the first and second cam profiles is held within the rocker arm travel constraint.

15 Claims, 10 Drawing Sheets

Related U.S. Application Data continuation of application No. PCT/US2016/067974, filed on Dec. 21, 2016.

(51) Int. Cl.
*F01L 13/00* (2006.01)
*F02D 13/02* (2006.01)

(52) U.S. Cl.
CPC .... *F02D 13/0207* (2013.01); *F01L 2001/186* (2013.01); *F01L 13/0015* (2013.01); *F01L 2305/00* (2020.05); *F01L 2800/10* (2013.01); *F01L 2820/01* (2013.01); *Y02T 10/12* (2013.01)

(56) References Cited

U.S. PATENT DOCUMENTS

| | | | |
|---|---|---|---|
| 4,796,483 A | 1/1989 | Patel et al. | |
| 6,705,259 B1* | 3/2004 | Sellnau | F01L 1/181 123/90.2 |
| 7,730,861 B2 | 6/2010 | Ng | |
| 2001/0023675 A1 | 9/2001 | Lee et al. | |
| 2005/0241613 A1 | 11/2005 | Weber et al. | |
| 2005/0279303 A1 | 12/2005 | Murata | |
| 2008/0223324 A1* | 9/2008 | Ng | F01L 1/185 123/90.39 |
| 2010/0043737 A1 | 2/2010 | Elnick et al. | |
| 2012/0210964 A1 | 8/2012 | Barnes | |
| 2014/0190431 A1* | 7/2014 | McCarthy, Jr. | F01L 1/18 123/90.16 |
| 2015/0128890 A1* | 5/2015 | Cecur | F01L 13/0047 123/90.16 |
| 2015/0267574 A1 | 9/2015 | Radulescu et al. | |
| 2016/0032869 A1 | 2/2016 | Boyer et al. | |
| 2017/0241300 A1 | 8/2017 | Liskar et al. | |
| 2018/0238198 A1 | 8/2018 | Uckermark et al. | |

FOREIGN PATENT DOCUMENTS

| | | |
|---|---|---|
| EP | 1712748 B1 | 4/2010 |
| JP | 3263118 B2 | 3/2002 |
| JP | 2007113419 A | 5/2007 |

* cited by examiner

FIG - 7B

Rocker Arm on Valve 1 (10A):

| | | Short Duration | Long Duration |
|---|---|---|---|
| | Open Angle | 320 | 320 |
| | Close Angle | 510 | 570 |

Rocker Arm on Valve 2 (10B):

| | | Short Duration | Long Duration |
|---|---|---|---|
| | Open Angle | 320 | 320 |
| | Close Angle | 550 | 580 |

| | Options 1 | Options 2 | Options 3 | Options 4 |
|---|---|---|---|---|
| Valve 1 (360) | Short Duration | Long Duration | Short Duration | Long Duration |
| Close Angle | 510 | 570 | 510 | 570 |
| Valve 2 (362) | Short Duration | Short Duration | Long Duration | Long Duration |
| Close Angle | 550 | 550 | 580 | 580 |
| Resultant CA | 550 | 570 | 580 | 580 |

Takeaway: 4 Rocker Arm Duration Profile Options gives 3 Possible Valve Durations

VARIABLE INTAKE VALVE CLOSING USING THROUGH AXLE ROCKER ARM

CROSS-REFERENCE TO RELATED APPLICATIONS

This application is a continuation of U.S. patent application Ser. No. 16/447,071 filed Jun. 20, 2019, which is a continuation of International Application No. PCT/US2016/067974 filed Dec. 21, 2016. The disclosure of the above application is incorporated herein by reference.

FIELD

This application is directed to switching rocker arms for internal combustion engines.

BACKGROUND

Switching rocker arms allow for control of valve actuation by alternating between two or more states, usually involving multiple arms, such as in inner arm and outer arm. In some circumstances, these arms engage different cam lobes, such as low-lift lobes, high-lift lobes, and no-lift lobes. Switching rocker arms can be implemented as part of systems commonly referred to as variable valve timing (VVT) or variable valve actuation (VVA) to improve fuel economy, reduce emissions and improve driver comfort over a range of speeds. Mechanisms are required for switching rocker arm modes in a manner suited for operation of internal combustion engines.

SUMMARY

A method of using a through axle switching rocker arm according to one example of the present disclosure is provided. The switching rocker arm comprises an outer arm, an inner arm and a roller axle. The inner arm is pivotally coupled to the outer arm about a pivot axle and has an inner bushing that supports an inner roller. The inner bushing defines an inner diameter. The roller axle extends through the inner bushing and defines an outer diameter. The inner diameter of the inner bushing engages the outer diameter of the roller axle thereby inhibiting further pivoting of the inner arm relative to the outer arm defining a rocker arm travel constraint. The method includes designing first and second cam profiles based on the through axle switching rocker arm such that a difference in lift between the first and second cam profiles is held within the rocker arm travel constraint.

According to additional features, the first cam profile corresponds to a lift profile typifying a parabolic shape and the second cam profile corresponds to a lift profile typifying a parabolic shape and having a closing tail portion that increases a duration of valve lift. In another configuration, the first cam profile corresponds to a lift profile typifying a parabolic shape and the second cam profile corresponds to a lift profile typifying a parabolic shape and having an opening lead portion that increases a duration of valve lift. In another example the first cam profile corresponds to a lift profile typifying a parabolic shape and the second cam profile corresponds to a lift profile typifying a parabolic shape and having both of an opening lead portion and a closing tail portion that both increase a duration of a valve lift.

The switching rocker arm is configured for selective and alternative operation in (i) a first arrangement with a first cam having a first cam profile that implements an early intake valve closing (EIVC) valve actuation strategy and in (ii) a second arrangement with a second cam having a second cam profile that implements a late intake valve closing (LIVC) valve actuation strategy. The first and second cam profiles are formed such that a difference in lift between the first and second cam profiles is held within the rocker arm travel constraint. In one example, forming the first and second cam profiles includes forming a first cam having an early intake valve closing profile and a second cam having a high power intake profile. In another example, forming the first and second cam profiles comprises forming a first cam having an early intake valve closing profile and a second cam having a late intake closing profile. The late intake closing profile can include a closing tail portion that increases a duration of valve lift. The second cam can include one of a normal intake profile and a high power intake closing profile.

According to additional features the method includes configuring the switching rocker arm for selective and alternative operation (i) on a first valve having a first short duration close angle and a first long duration close angle; and (ii) on a second valve having a second short duration close angle and a second long duration close angle. Two switching rocker arms can be configured for concurrent use on a four valve per cylinder engine to attain three available valve opening durations. The inner diameter of the inner bushing is greater than the outer diameter of the roller axle. In one example, the inner diameter of the inner bushing and the outer diameter of the roller axle have a difference of 2.4 mm. In another example, the inner diameter of the inner bushing and the outer diameter of the roller axle have a difference of 3 mm. A latch pin of the switching rocker arm includes a latch pin that moves between (i) a latched position wherein the outer and inner arms rotate together about a pivot axle; and (ii) an unlatched position wherein the inner arm pivots relative to the outer arm about the pivot axle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

FIG. 7B is a table illustrating three duration options using the rocker arm of FIG. 2B;

DETAILED DESCRIPTION

Figure 1:
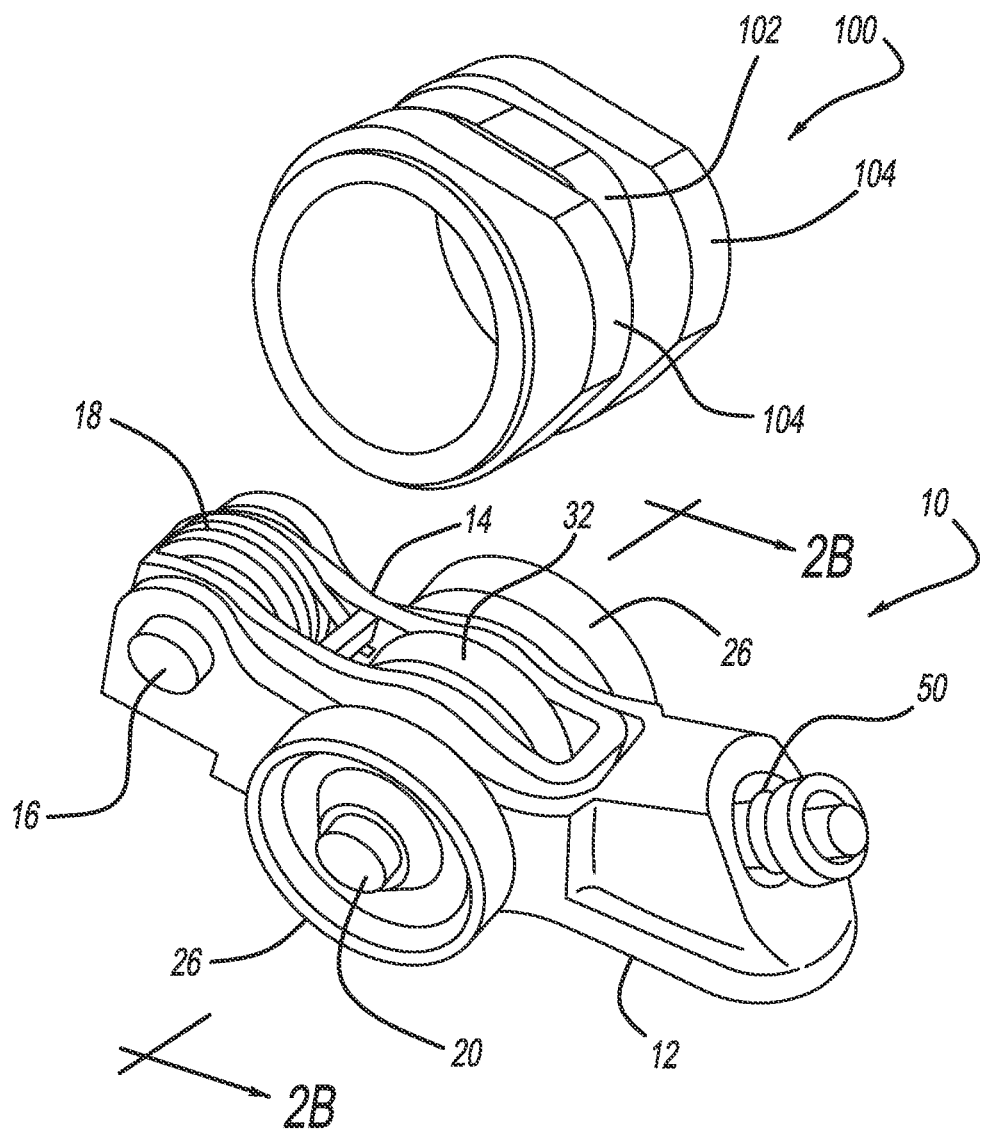
FIG. 1 is an exploded perspective view of an exemplary through roller axle switching rocker arm and exemplary cam.

Certain terminology will be used in the following description for convenience in describing the figures will not be limiting. The terms "upward," "downward," and other directional terms used herein will be understood to have their normal meanings and will refer to those directions as the drawing figures are normally viewed. As used herein, the term "parabolic" is used to denote a lift profile that typifies a parabolic shape. It will be appreciated that is used to encompass lift profiles that may include generally flat crest portions or other variations of a pure parabola.

Figure 2A:
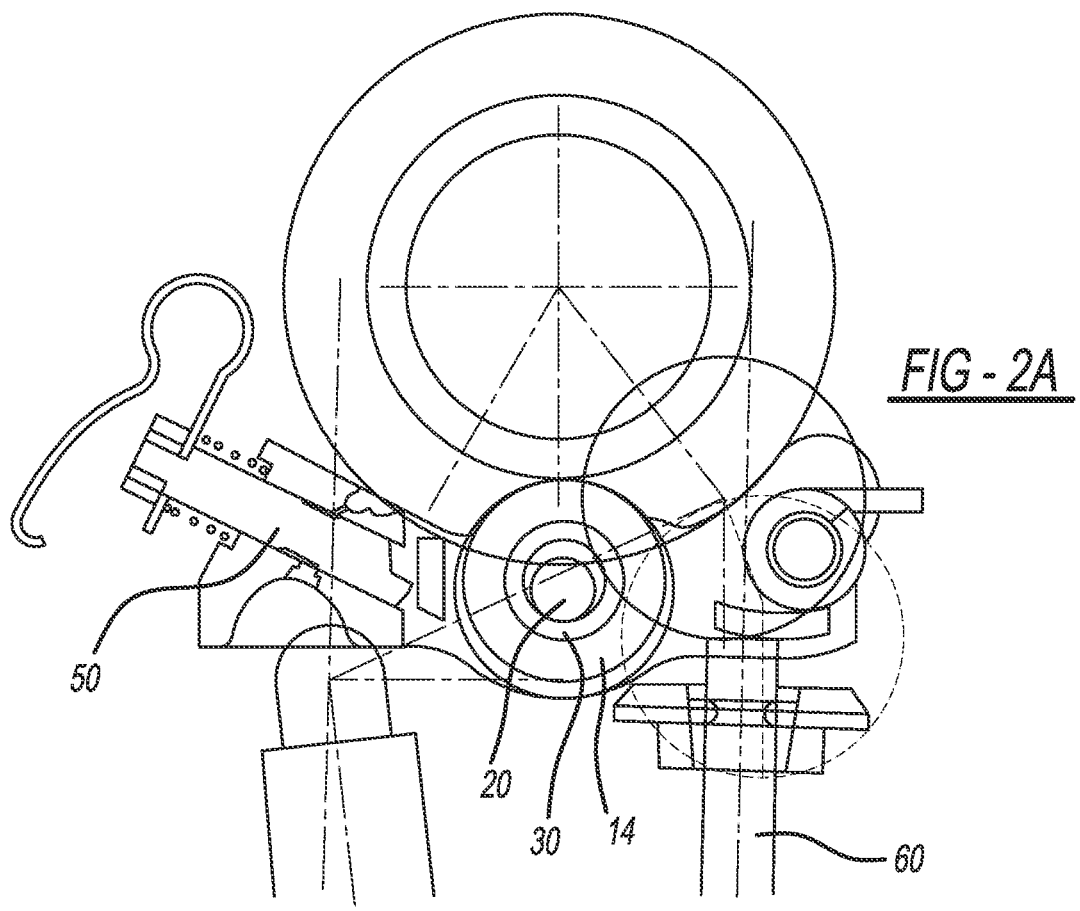
FIG. 2A is a schematic view of the switching rocker arm and cam of FIG. 1, shown with an exemplary valve and hydraulic lash adjuster.
Figure 2B:
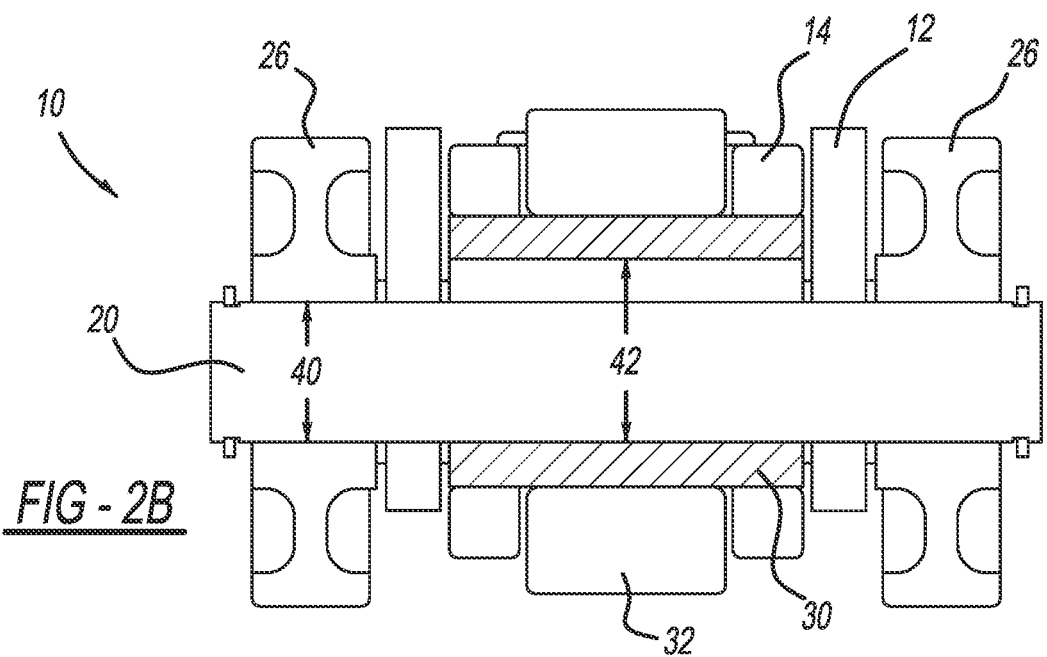
FIG. 2B is a sectional view taken along lines 2B-2B of FIG. 1.

With initial reference to FIGS. 1-2B, a switching rocker arm 10 constructed in accordance to one example of the present disclosure is shown. As will become appreciated from the following discussion, the switching rocker arm 10 is a through roller axle switching rocker arm that can be used for both late intake valve closing (LIVC) and early intake valve closing (EIVC) valve actuation strategies as well as exhaust gas recirculation (EGR). Cam profiles are modified according to application to achieve the desired valve actuation strategies using a common switching rocker arm 10. In this regard, the same switching rocker arm 10 can be provided for accomplishing various valve actuation strategies.

The switching rocker arm 10 generally includes an outer arm 12 and an inner arm 14 that are pivotally connected at a pivot axle 16. A roller axle 20 extends transversely through the outer arm 12 and supports a pair of outer rollers 26. The inner arm 14 comprises an inner bushing 30 that supports an inner roller 32. The roller axle 20 extends through the inner bushing 30. The roller axle 20 defines an outer diameter 40. The inner bushing 30 defines an inner diameter 42. As will become appreciated herein, a stop function or rocker arm 10 travel constraint is provided by the switching rocker arm 10 by the interaction of the outer diameter 40 of the roller axle 20 and the inner diameter 42 of the inner bushing. By way of example only, the switching rocker arm 10 includes a difference between the outer diameter 40 of the roller axle 20 and the inner diameter of the inner bushing 30 of 2.4 mm. In other configurations, a difference or rocker arm travel constraint of 3.0 mm can be provided. For a rocker ratio of 1.68, having a clearance of 2.4 mm will yield 4 mm of motion at the valve 60. Again, it will be appreciated that the teachings of the present disclosure may be equally applied to switching rocker arms having other dimensions.

The switching rocker arm 10 includes a latch pin 50 that moves between a latched position and an unlatched position. When the latch pin 50 is in the unlatched position, the inner arm 14 is free to pivot (downward as viewed in FIG. 1) with respect to the outer arm 12 about the pivot axle 16. A biasing member 18 biases the inner arm 14 relative to the outer arm 12 back to the position shown in FIG. 1. When the latch pin 50 is in the latched position, the latch pin 50 engages the inner arm 14 and prevents the inner arm 14 from pivoting with respect to the outer arm 12 such that the inner and outer arms 14 and 12 rotate together about the pivot axle 16 as a single body.

For exemplary purposes, a cam 100 is shown for cooperation with the switching rocker arm 10. The cam 100 includes an inner cam 102 and a pair of outer cams 104. The inner cam 102 is configured to engage the inner roller 32 while the outer cams 104 are configured to engage the outer rollers 26. Again, as used herein, the inner and outer cams 102 and 104 are formed such that a difference in lift between the first and second cam profiles is held within the rocker arm travel constraint.

When the switching rocker arm 10 is in the latched configuration, the switching rocker arm 10 may, for example, perform two valve events in a single engine cycle, for example, a normal valve lift of an exhaust valve 60 in response to the pair of cams 104 acting on the outer rollers 26 and an additional valve lift of the exhaust valve (e.g., to provide for an EGR) in response to an additional cam 102 acting on the inner roller 32.

When the switching rocker arm 10 is in the unlatched configuration, the switching rocker arm 10 may, for example, perform a single valve event in an engine cycle. For example, the switching rocker arm 10 may perform the normal valve lift of an exhaust valve in response to the pair of cams 104 acting on the outer rollers 26. The additional valve lift of the exhaust valve 60 in response to the additional cam 102 acting on the inner roller 32 does not occur because the inner arm 14 pivots with respect to the outer arm 12 and so no force is exerted on the valve 60.

The amount of pivoting available to the inner arm 14 with respect to the outer arm 12 is defined by the difference in size between the outer diameter 40 of the roller axle 20 and the inner diameter 42 of the inner bushing 30. When the inner arm 14 is returned to its starting position subsequent to pivoting, the inner bushing 30 is stopped by the roller axle 20 in the correct position to enable the latch pin 50 to engage the inner arm 14.

According to the present disclosure, the same switching rocker arm 10 can be used for both late intake valve closing (LIVC) and early intake valve closing (EIVC) valve actuation strategies as well as exhaust gas recirculation (EGR) by modifying the respective cam profiles of the cam 100. The below discussion contemplates various different configurations of the cam 100 while using the same switching rocker arm 10 to achieve LIVC or EIVC depending on the desired application. As can be appreciated, cost benefits can be realized when requiring only one rocker arm that can be implemented across broad vehicle applications for distinct valve control strategies.

Figure 3A:
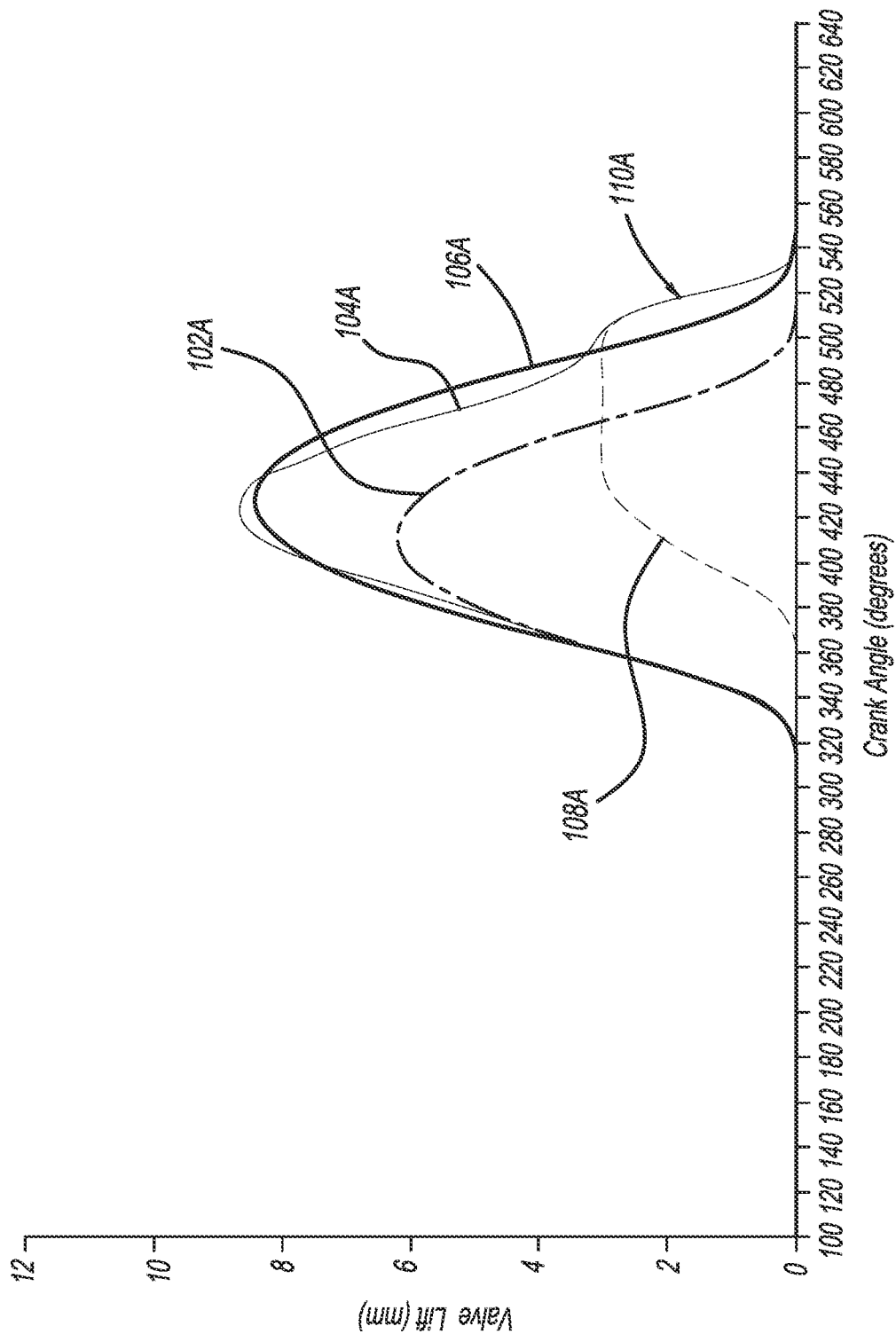
FIG. 3A is a plot of valve lift versus crank angle using the rocker arm of FIG. 2B and incorporating a cam that implements an early intake valve closing strategy according to one example of the present disclosure.
Figure 3B:
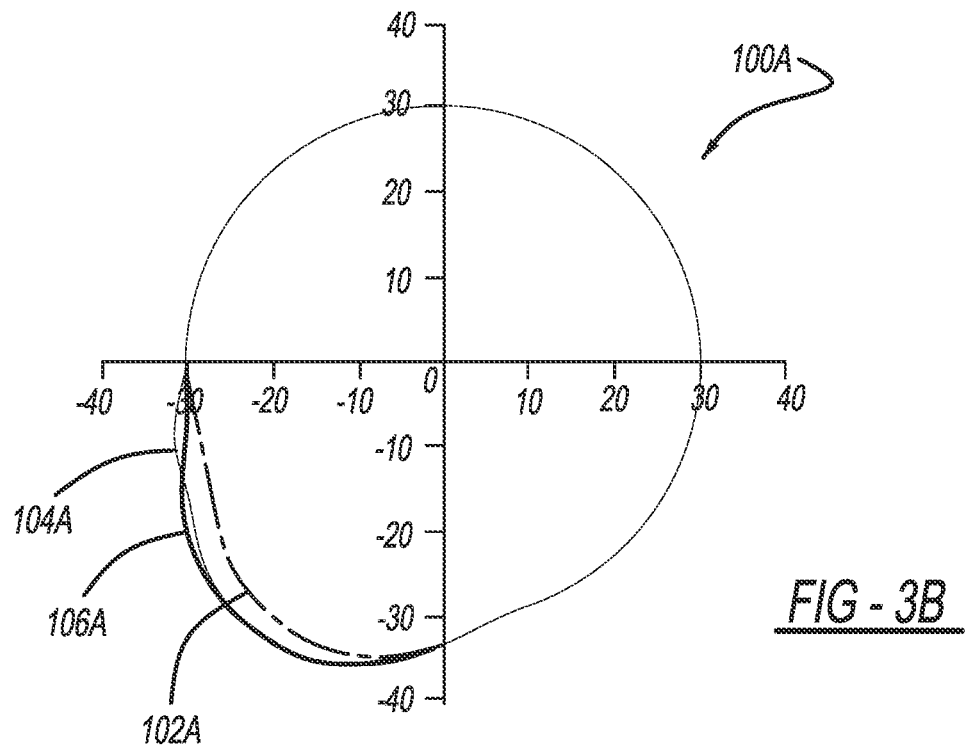
FIG. 3B is a cam used to implement the early intake valve closing strategy of FIG. 3A.

Turning now to FIGS. 3A and 3B, a cam 100A can be used with the switching rocker arm 10 for an EIVC strategy. For some cases, most of the lifecycle of an internal combustion engine is operating at a part load (EIVC) condition. The cam 100A can be designed to have a traditional parabolic EIVC cam profile while the normal cam profile will be modified to accommodate the limitations of the rocker arm assembly 10. In this regard, the cam 100A includes an early intake closing profile 102A and a high power intake profile 104A. The early intake closing profile 102A is used for one of the two lifts on the switching rocker arm 10. As mentioned above, most of the life cycle of an engine will operate using the early intake closing profile 102A.

The high power intake profile 104A is used for the other of the two lifts on the switching rocker arm 10. For comparison purposes, a traditional normal intake profile 106A is also shown. For purposes of this discussion, a reference trace 108A is shown having a 3 mm valve lift (within the design constraints of the rocker arm 10). The reference trace 108A does not follow any cam profile, rather it is shown merely a mathematical constraint. The 3 mm represents the maximum difference allowed between the early intake closing profile 102A and the traditional normal intake profile 106A (or the high power intake profile 104A). Of note, the normal intake profile 104A further incorporates a "closing tail" portion 110A. The closing tail portion 110A occurs on a trailing edge of a lift profile typifying a parabolic shape and mimics the trailing end of the reference trace 108A and increases a duration of the valve lift over the traditional normal intake profile 106A for common crank angles around 490 to 540 degrees. Other angles are contemplated. Again, it will be appreciated that for the example provided, the maximum difference between the early intake closing profile 102A and the normal intake profile 104A must be below 3 mm as required by the geometrical limitations of the rocker arm 10 described above.

The switching rocker arm 10 can be used with a cam having cam profiles that are optimized for operation during the biggest window of duty cycle or engine operation (or in the above example, the early intake closing profile 102A). Some compromises may be made relative to the performance of engine breathing and valve profiles necessary to stay within the 3 mm criteria required above. However, the compromises are reasonable as the engine will operate minimally during these times.

Referencing FIG. 3A, where the center cam 102 has either profile 106A or 104A, the rocker arm 10 will have to be latched to lock the center rocker arm 14 to the outer rocker arm 12. In order to get profile 102A, the rocker arm 10 has to be unlatched and allow the center rocker arm 14 to move at a different rate than that of the outer rocker arm 12. The motion between the outer rocker arm 12 and the center rocker arm 14 will be the delta 108A. If a profile duration 102A is decreased sufficiently (as an example from a duration of 520-320=200 to 420-320=100) then the profile 104A would have to be modified to keep 108A below the rocker arm travel constraint (in this example 3 mm). Further, the closing tail 110A would have to be added in order to get the profile 104A to have a duration 540-320=220.

Figure 4B:
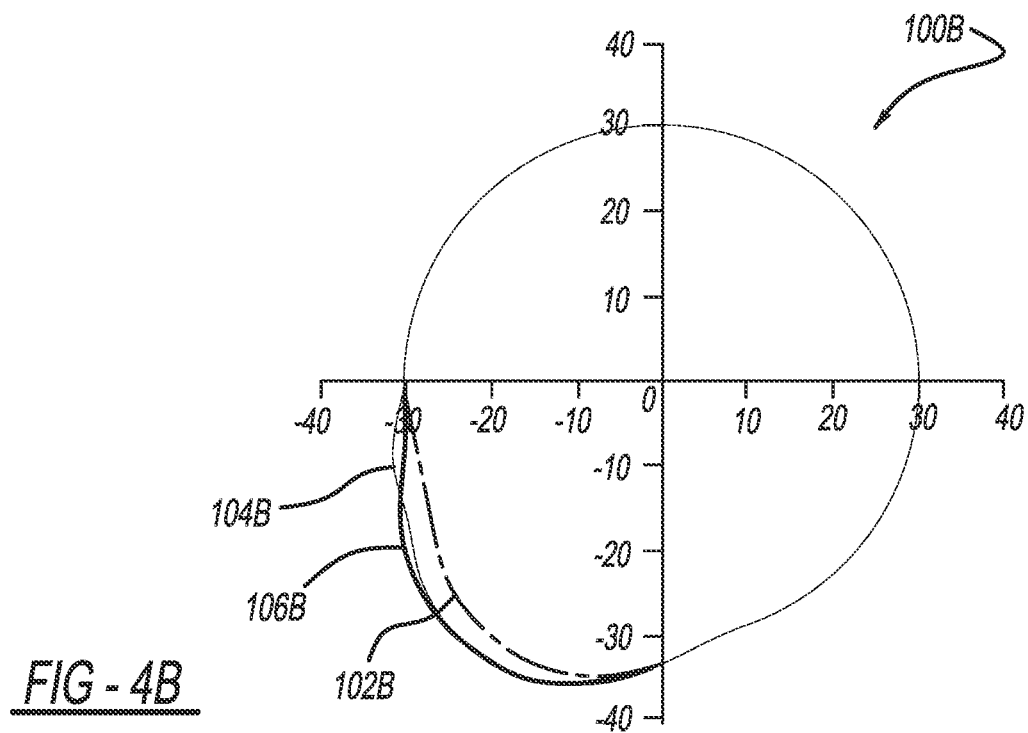
FIG. 4B is a cam used to implement the late intake valve closing strategy of FIG. 4A.
Figure 4A:
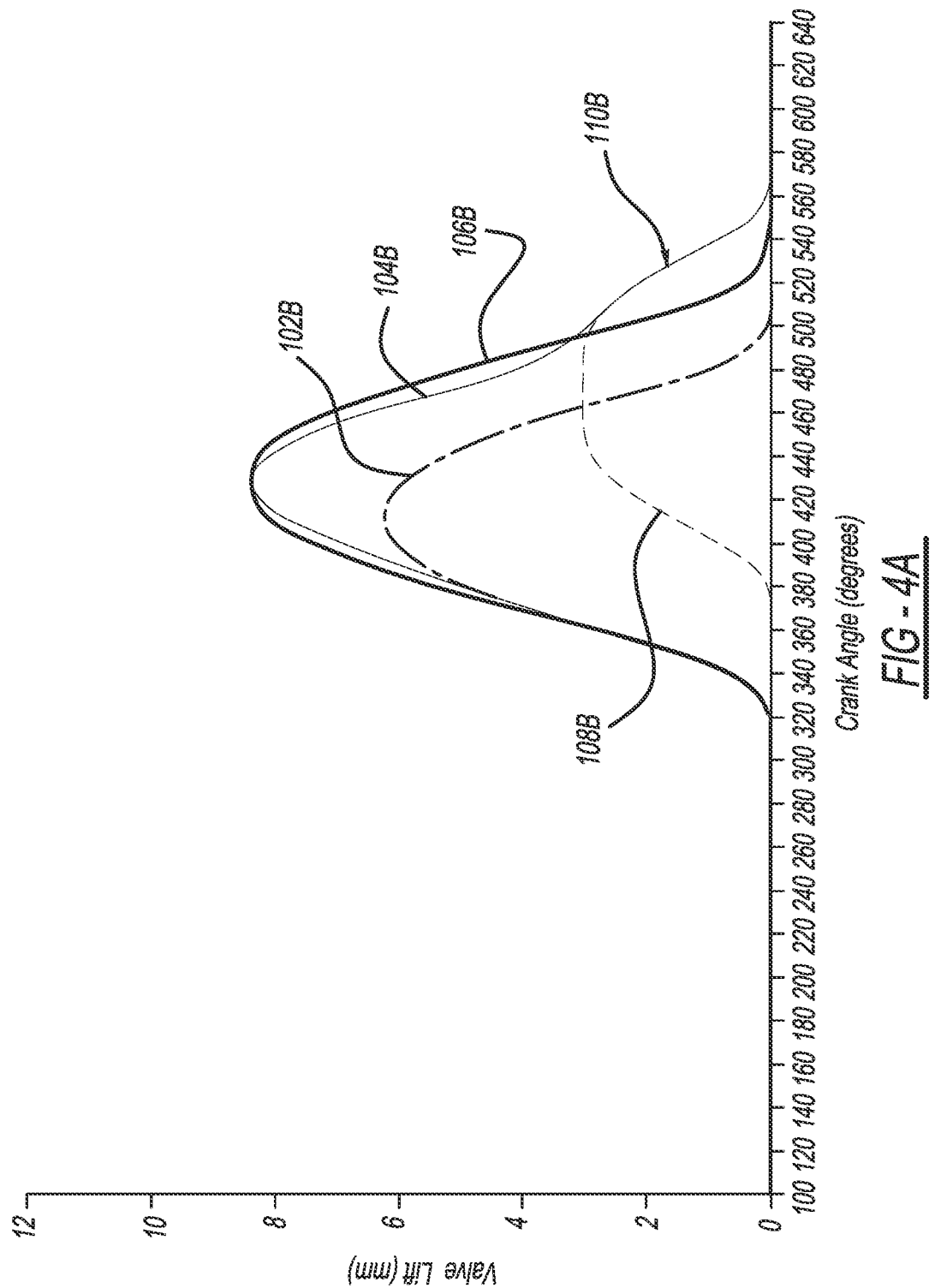
FIG. 4A is a plot of valve lift versus crank angle using the rocker arm of FIG. 2B and incorporating a cam that implements a late intake valve closing strategy according to another example of the present disclosure.

Turning now to FIGS. 4A and 4B, a cam 100B can be used with the same switching rocker arm 10 for a LIVC strategy. For some cases, most of the lifecycle of an internal combustion engine is operating at a part load (LIVC) condition. The cam 100B can be designed to have a traditional parabolic early intake closing profile 102B while the normal cam profile will be modified to accommodate the limitations of the rocker arm 10. In this regard, the cam 100B includes the early intake closing profile 102B and a late intake closing profile 104B. The early intake closing profile 102B is used for one of the two lifts on the switching rocker arm 10. Again, most of the life cycle of the engine will operate using the early intake closing profile 102B.

The late intake closing profile 104B is used for the other of the two lifts on the switching rocker arm 10. For comparison purposes, a traditional normal intake profile 106B is also shown. For purposes of discussion, a reference trace 108B is shown having a 3 mm valve lift (within the design constraints of the rocker arm 10). The reference trace 108B does not follow any cam profile, rather it is shown merely as a mathematical constraint. The 3 mm represents the maximum difference allowed between the early intake closing profile 102B and the traditional normal intake profile 106B (or the late intake closing profile 104B).

Of note, the LIVC profile 104B further incorporates a "closing tail" portion 110B. The closing tail portion 110B mimics the trailing end of the reference trace 108B and increases a duration of the valve lift over the traditional normal intake profile 106B for common crank angles around 490 to 540 degrees. Other angles are contemplated. Again, it will be appreciated that for the example provided, the maximum difference between the late intake closing profile 104B and the early intake closing profile 102B must be below 3 mm as required by the geometrical limitations of the rocker arm 10 described above.

For FIG. 4A, where the center cam 102 has either profile 106B or 104B, the rocker arm 10 will have to be latched to lock the center rocker arm 14 to the outer rocker arm 12. In order to get the profile 102B, the rocker arm 10 has to be unlatched and allow the center rocker arm 14 to move at a different rate than that of the outer rocker arm 12. The motion between the outer rocker arm 14 and the center rocker arm 12 will be the delta 108B (for case 102B compared to 104B).

Figure 5A:
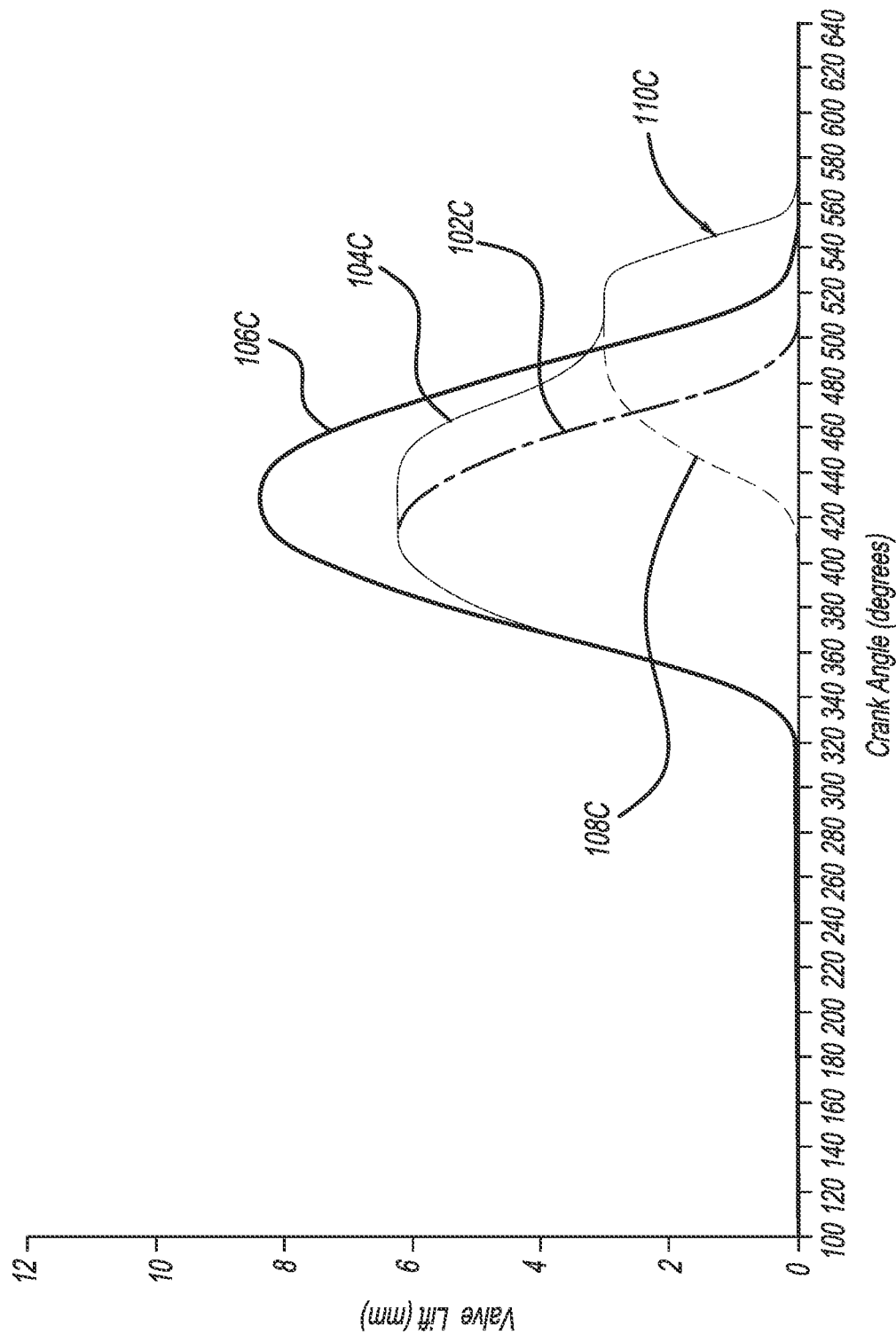
FIG. 5A is a plot of valve lift versus crank angle using the rocker arm of FIG. 2B and incorporating a cam that implements a late intake valve closing strategy according to yet another example of the present disclosure.
Figure 5B:
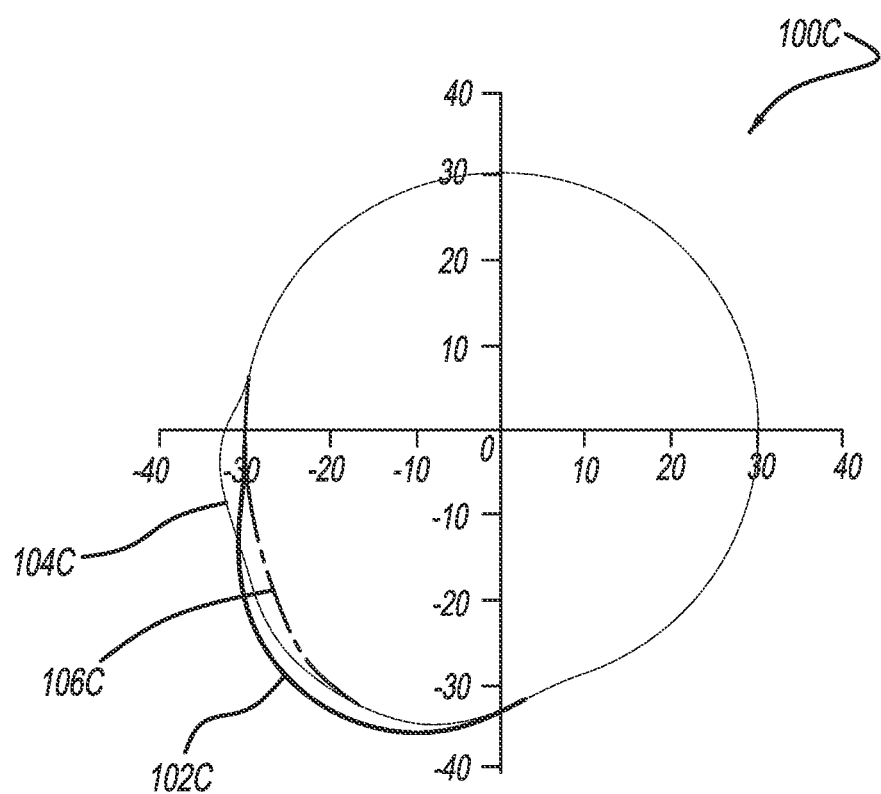
FIG. 5B is a cam used to implement the late intake valve closing strategy of FIG. 5A.

Turning now to FIGS. 5A and 5B, a cam 100C can be used with the same switching rocker arm 10 for a LIVC strategy. The cam 100C can be configured to implement a LIVC strategy having an alternate profile from the cam 100B described above. The cam 100C can be designed to have a high power LIVC profile 104C per the geometrical limitations of the rocker arm 10. The LIVC profile 104C can be a high power intake closing profile (one of the two lifts on the rocker arm 10). The LIVC profile 104C is used for one of the two lifts on the switching rocker arm 10. A normal lift profile can be incorporated by parabolic cam profile 106C and used for the other of the two lifts on the rocker arm 10.

A reference trace 108C is shown having a 3 mm valve lift (within the design constraints of the rocker arm 10). The reference trace 108C does not follow any cam profile, rather it is shown merely a mathematical constraint. The 3 mm represents the maximum difference allowed between the traditional normal intake profile 106C and the early intake closing profile 102C (or the high power LIVC profile 104C).

Of note, the high power LIVC profile 104C further incorporates a "closing tail" portion 110C. The closing tail portion 110C occurs on a trailing edge of a lift profile typifying a parabolic shape and mimics the trailing end of the reference trace 108C and increases a duration of the valve lift for common crank angles around 490 to 540 degrees. Other angles are contemplated. Again, it will be appreciated that for the example provided, the maximum difference between the traditional normal intake profile 106C and the early intake closing profile 102C (or the high power LIVC profile 104C) must be below 3 mm as required by the geometrical limitations of the rocker arm 10 described above.

Figure 6:
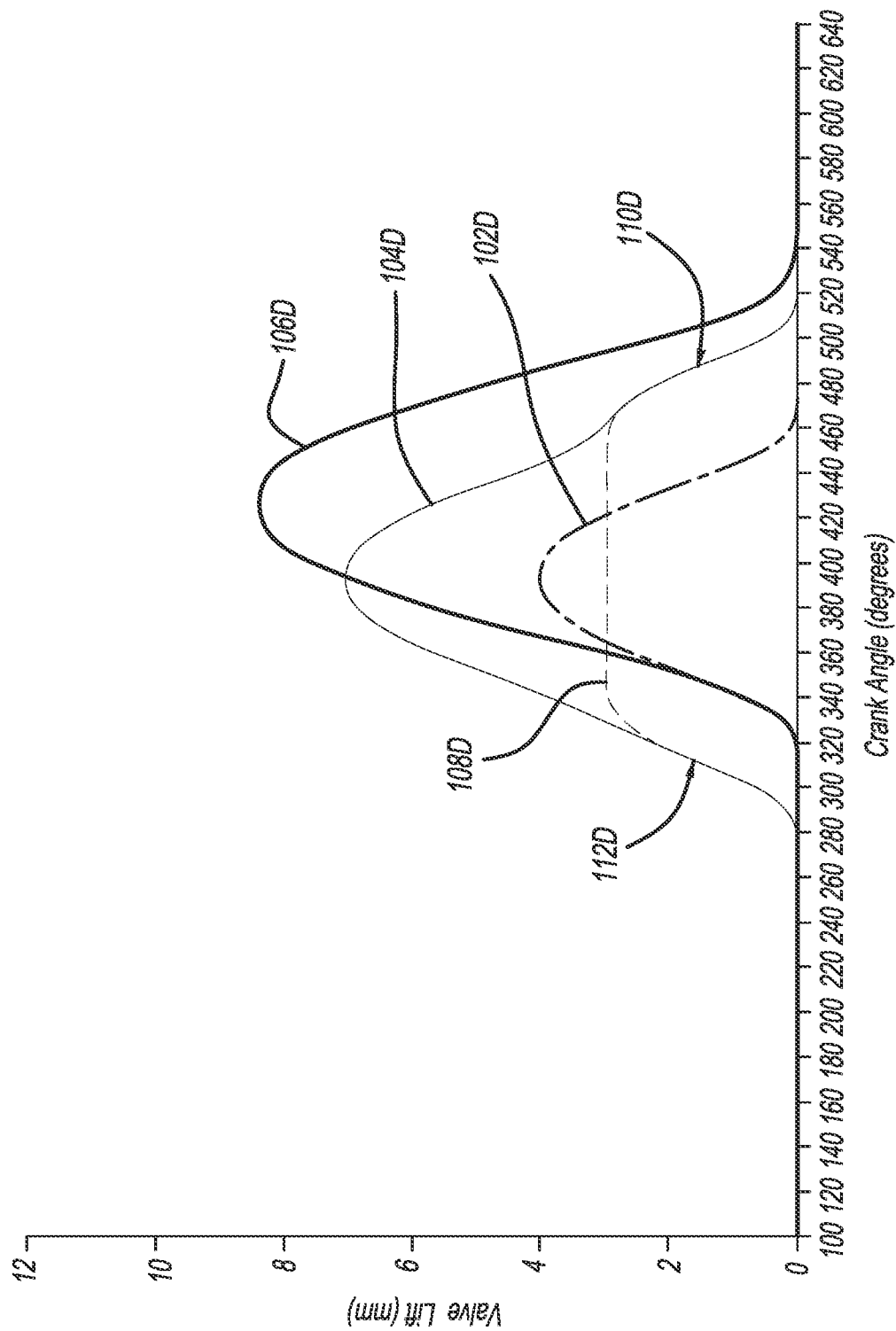
FIG. 6 is a plot of valve lift versus crank angle using the rocker arm of FIG. 2B and incorporating a cam that implements a late intake valve closing strategy according to still another example of the present disclosure.

With reference now to FIG. 6, a cam (not shown) can be used with the same switching rocker arm 10 for a LIVC strategy. The cam can be configured to implement a LIVC strategy having an alternate profile from the cam 100B and 100C described above. The cam can be designed to have a modified LIVC profile 104D per the geometrical limitations of the rocker arm 10. The LIVC profile 104D can represent the best high power intake profile possible with the geometrical characteristics of the rocker arm 10. The LIVC profile 104D can be used on one of the two lifts on the rocker arm 10. A normal lift profile 106D is shown as well as an extreme low lift intake profile 102D. The extreme low lift intake profile 102D can be used on the other of the two lifts on the rocker arm 10.

A reference trace 108D is shown having a 3 mm valve lift (within the design constraints of the rocker arm 10). The reference trace 108D does not follow any cam profile, rather it is shown merely a mathematical constraint. The 3 mm represents the maximum difference allowed between the best high power intake profile 104D and the extreme low lift intake profile 102D. Of note, the LIVC profile 104D further incorporates a "closing tail" portion 110D and an "opening lead" portion 112D. The opening lead portion occurs at an opening portion of a parabolic lift and increases a duration of lift. The closing tail portion 110C occurs at a trailing portion of a parabolic lift and increases a duration of the valve lift for common crank angles around 480 to 560 degrees. Other angles are contemplated. Again, it will be appreciated that for the example provided, the maximum difference between the LIVC profile 104D and the extreme low lift intake profile 102D must be below 3 mm as required by the geometrical limitations of the rocker arm 10 described above.

FIG. 6 is designed for extreme cases of EIVC (102D) where the center cam has profile 104D (profile 106D is only as referenced to communicate a normal cam profile). The rocker arm 10 will have to be latched to lock the center rocker arm to the outer rocker arm. In order to get profile 102D, the rocker arm has to be unlatched and allow the center rocker arm 14 to move at a different rate than that of the outer rocker arm 12. The motion between the outer rocker arm 12 and the center rocker arm 14 will be the delta 108D. If it is needed to have the same starting point (valve opening point of 320), then while the cam is on the base circle and shifting from profile 102D to profile 104D, the cam phase has to move to put the valve opening point at the same location of 320 instead of that shown of 280.

Figure 7A:
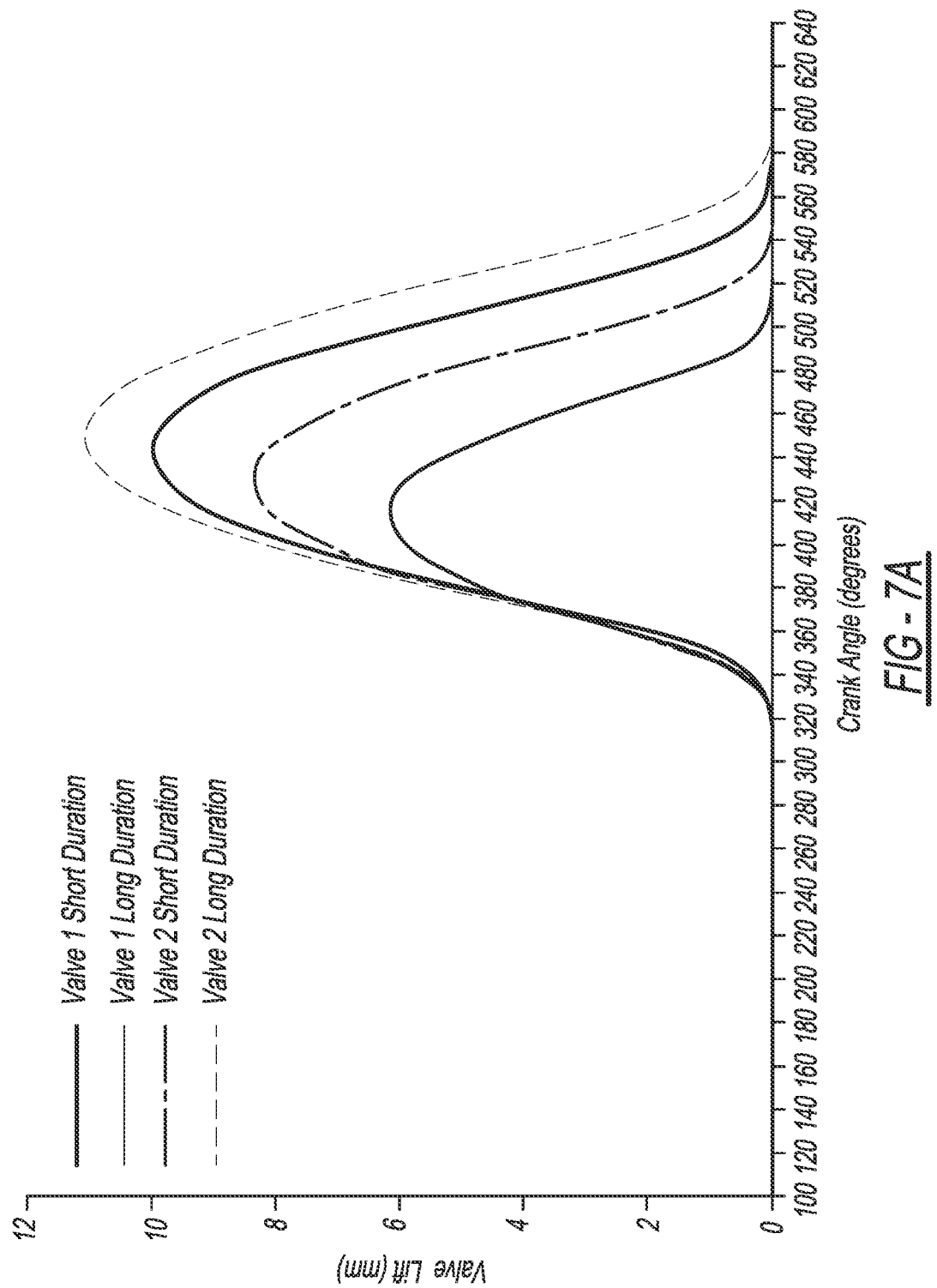
FIG. 7A is a plot of valve lift versus crank angle using the rocker arm of FIG. 2B and incorporating various long and short durations on a first and second valve.

FIGS. 7A and 7B illustrate four rocker arm duration profile options that can yield three possible valve durations for a first valve 360 and a second valve 362 using the rocker arm 10. In this regard, three durations are possible using two rocker arms 10A and 10B on a given cylinder. The arrangement would require a latching device that independently controls each rocker arm. One example latching device includes an electric latch ore-latch that incorporates electrically controlled switching of the rocker arm. Other examples include hydraulic and mechanical control. Because each rocker arm can be independently controlled, more options are available as compared to merely a hydraulic configuration that may incorporate a single solenoid for multiple rocker arms. It will be appreciated that the angle values are merely exemplary and that different cam geometries may be implemented for attaining other open and close angles within the scope of the present disclosure.

While the present disclosure illustrates various examples, and while these examples have been described in some detail, it is not the intention of the applicant to restrict or in any way limit the scope of the claimed invention to such detail. Additional advantages and modifications will readily appear to those skilled in the art. Therefore, the disclosure, in its broader aspects, is not limited to the specific details and illustrative examples shown and described. Accordingly, departures may be made from such details without departing from the spirit or scope of the applicant's claimed disclosure. Moreover, the foregoing examples are illustrative, and no single feature or element is essential to all possible combinations that may be claimed in this or a later application.

What is claimed is:

1. A method of using a through axle switching rocker arm comprising an outer arm, an inner arm and a roller axle, the inner arm pivotally coupled to the outer arm about a pivot axle and having an inner bushing that supports an inner roller, the inner bushing defining an inner diameter, the roller axle extending through the outer arm and supporting a pair of outer rollers, the roller axle extending through the inner bushing and defining an outer diameter, wherein the inner diameter of the inner bushing engages the outer diameter of the roller axle thereby inhibiting further pivoting of the inner arm relative to the outer arm defining a rocker arm travel constraint, the method comprising:
   operating the through axle switching rocker arm in selective operation in (i) a first arrangement with a first cam having a first cam profile that implements an early intake valve closing (EIVC) valve actuation strategy and in (ii) a second arrangement with a second cam having a second cam profile that implements a late intake valve closing (LIVC) valve actuation strategy.

2. The method of claim 1 wherein the first cam profile corresponds to a lift profile typifying a parabolic shape and the second cam profile corresponds to a lift profile typifying a parabolic shape and having a closing tail portion that increases a duration of valve lift.

3. The method of claim 1 wherein the first cam profile corresponds to a lift profile typifying a parabolic shape and the second cam profile corresponds to a lift profile typifying a parabolic shape and having an opening lead portion that increases a duration of valve lift.

4. The method of claim 1 wherein the first cam profile corresponds to a lift profile typifying a parabolic shape and the second cam profile corresponds to a lift profile typifying a parabolic shape and having both of an opening lead portion and a closing tail portion that both increase a duration of a valve lift.

5. The method of claim 1, further comprising:
   forming the first and second cam profiles such that a difference in lift between the first and second cam profiles is held within the rocker arm travel constraint.

6. The method of claim 5 wherein forming the first and second cam profiles comprises forming the first cam having an early intake valve closing profile and the second cam having a high power intake profile.

7. The method of claim 5 wherein forming the first and second cam profiles comprises forming the first cam having an early intake valve closing profile and the second cam having a late intake closing profile.

8. The method of claim 1 wherein the second cam includes one of a normal intake profile and a high power intake closing profile.

9. The method of claim 1, further comprising:
configuring the switching rocker arm for selective and alternative operation (i) on a first valve having a first short duration close angle and a first long duration close angle; and configuring a second switching rocker arm for selective and alternative operation (ii) on a second valve having a second short duration close angle and a second long duration close angle.

10. The method of claim 1, further comprising:
providing the through axle switching rocker arm wherein the inner diameter of the inner bushing is greater than the outer diameter of the roller axle.

11. The method of claim 10 wherein the inner diameter of the inner bushing and the outer diameter of the roller axle have a difference of 2.4 mm.

12. The method of claim 10 wherein the inner diameter of the inner bushing and the outer diameter of the roller axle have a difference of 3 mm.

13. The method of claim 10, further comprising providing a latch pin that moves between (i) a latched position wherein the outer and inner arms rotate together about the pivot axle; and (ii) an unlatched position wherein the inner arm pivots relative to the outer arm about the pivot axle.

14. A method of designing a through axle switching rocker arm comprising an outer arm, an inner arm and a roller axle, the inner arm pivotally coupled to the outer arm about a pivot axle and having an inner bushing that supports an inner roller, the inner bushing defining an inner diameter, the roller axle extending through the outer arm and supporting a pair of outer rollers, the roller axle extending through the inner bushing and defining an outer diameter, wherein the inner diameter of the inner bushing engages the outer diameter of the roller axle thereby inhibiting further pivoting of the inner arm relative to the outer arm defining a rocker arm travel constraint, the method comprising:
designing first and second cam profiles based on the through axle switching rocker arm such that a difference in lift between the first and second cam profiles is held within the rocker arm travel constraint whereby the first cam profile defines an early intake valve closing profile, and the second cam profile defines a late intake closing profile; and
operating the through axle switching rocker arm for selective and alternative operation in (i) a first arrangement with a first cam having the first cam profile that implements an early intake valve closing (EIVC) valve actuation strategy and in (ii) a second arrangement with a second cam having the second cam profile that implements a late intake valve closing (LIVC) valve actuation strategy.

15. A method of designing a through axle switching rocker arm comprising an outer arm, an inner arm and a roller axle, the inner arm pivotally coupled to the outer arm about a pivot axle and having an inner bushing that supports an inner roller, the inner bushing defining an inner diameter, the roller axle extending through the outer arm and supporting a pair of outer rollers, the roller axle extending through the inner bushing and defining an outer diameter, wherein the inner diameter of the inner bushing engages the outer diameter of the roller axle thereby inhibiting further pivoting of the inner arm relative to the outer arm defining a rocker arm travel constraint, the method comprising:
designing first and second cam profiles based on the through axle switching rocker arm such that a difference in lift between the first and second cam profiles is held within the rocker arm travel constraint, wherein the first cam profile corresponds to a lift profile typifying a parabolic shape and the second cam profile corresponds to a lift profile typifying a parabolic shape and having an opening lead portion that increase a duration of a valve lift; and
operating the through axle switching rocker arm for selective and alternative operation in (i) a first arrangement with a first cam having the first cam profile that implements an early intake valve closing (EIVC) valve actuation strategy and in (ii) a second arrangement with the second cam having a second cam profile that implements a late intake valve closing (LIVC) valve actuation strategy.

\* \* \* \* \*